(12) United States Patent
Min et al.

(10) Patent No.: US 11,210,109 B2
(45) Date of Patent: Dec. 28, 2021

(54) METHOD AND SYSTEM FOR LOADING RESOURCES

(71) Applicant: BANMA ZHIXING NETWORK CO., LIMITED, Kowloon (HK)

(72) Inventors: Hongbo Min, Shanghai (CN); Yongsheng Zhu, Hangzhou (CN); Zhenhua Lu, Shanghai (CN); Zhiping Lin, Shanghai (CN); Yanming Cai, Hangzhou (CN); Xu Zeng, Shanghai (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 0 days.

(21) Appl. No.: 16/557,792

(22) Filed: Aug. 30, 2019

(65) Prior Publication Data

US 2020/0057658 A1 Feb. 20, 2020

Related U.S. Application Data

(63) Continuation-in-part of application No. PCT/CN2018/077220, filed on Feb. 26, 2018.

(30) Foreign Application Priority Data

Mar. 8, 2017 (CN) .......................... 201710137173.1

(51) Int. Cl.
*G06F 9/445* (2018.01)
*G06F 16/958* (2019.01)
(Continued)

(52) U.S. Cl.
CPC .......... *G06F 9/44521* (2013.01); *G06F 9/542* (2013.01); *G06F 16/986* (2019.01); *G06F 9/451* (2018.02); *G06F 2209/548* (2013.01)

(58) Field of Classification Search
CPC .... G06F 9/44521; G06F 16/986; G06F 9/542; G06F 9/451; G06F 2209/548; G06F 9/54;
(Continued)

(56) References Cited

U.S. PATENT DOCUMENTS 6,807,570 B1 * 10/2004 Allen .................. G06F 16/9574
709/219
8,572,682 B2 10/2013 Karabulut
(Continued)

FOREIGN PATENT DOCUMENTS

CN 105607895 5/2016
CN 105701246 6/2016
(Continued)

OTHER PUBLICATIONS

Node, ("Node.js v14.9.0 Documentation", 2016, pp. 1-29.*
Davies, "How the Browser Pre-loader Makes Pages Load Faster", pp. 1-6. (Year: 2013).*

*Primary Examiner* — Doon Y Chow
*Assistant Examiner* — Phuong N Hoang
(74) *Attorney, Agent, or Firm* — Van Pelt, Yi & James LLP (57) ABSTRACT

Loading resources is disclosed including sending, using a first thread, a resource loading request to a second thread, the resource loading request including a request for a resource, the first thread and the second thread being located in one process; and the first thread running on a dynamic language runtime platform, receiving, using the first thread, an instruction sent back by the second thread in response to the resource loading request, and based on the instruction and the resource preloaded by the process, loading, using the first thread, the resource included in the resource loading request, the resource being preloaded by the process comprises a web engine.

13 Claims, 10 Drawing Sheets

(51) Int. Cl.
*G06F 9/54* (2006.01)
*G06F 9/451* (2018.01)

(58) Field of Classification Search
CPC ............... G06F 9/5011; G06F 9/45504; G06F 9/45529; G06F 16/00
See application file for complete search history.

(56) References Cited

U.S. PATENT DOCUMENTS

| | | | |
|---|---|---|---|
| 9,565,233 B1* | 2/2017 | Ozuysal | H04L 67/2842 |
| 9,569,191 B2 | 2/2017 | O'Meara | |
| 2002/0156897 A1* | 10/2002 | Chintalapati | H04L 67/142 |
| | | | 709/227 |
| 2009/0024986 A1 | 1/2009 | Meijer | |
| 2012/0167122 A1* | 6/2012 | Koskimies | G06F 9/5027 |
| | | | 719/328 |
| 2013/0111500 A1* | 5/2013 | Dixon | G06F 9/44 |
| | | | 719/314 |
| 2014/0075546 A1* | 3/2014 | Zeng | G06F 21/52 |
| | | | 726/17 |
| 2015/0121198 A1* | 4/2015 | Simonsen | G06F 16/9574 |
| | | | 715/236 |
| 2015/0149186 A1* | 5/2015 | Rao | G06F 3/162 |
| | | | 704/500 |
| 2015/0206269 A1* | 7/2015 | Qin | H04N 21/42653 |
| | | | 715/202 |

FOREIGN PATENT DOCUMENTS

| | | |
|---|---|---|
| CN | 105893446 | 8/2016 |
| CN | 105912689 | 8/2016 |

* cited by examiner

METHOD AND SYSTEM FOR LOADING RESOURCES

CROSS REFERENCE TO OTHER APPLICATIONS

This application is a continuation-in-part of and claims priority to International (PCT) Application No. PCT/CN2018/077220, entitled RESOURCE LOADING METHOD AND DEVICE filed on Feb. 26, 2018 which is incorporated herein by reference in its entirety for all purposes, which claims priority to China Patent Application No. 201710137173.1, entitled A METHOD AND MEANS FOR LOADING RESOURCES filed on Mar. 8, 2017 which is incorporated by reference in its entirety for all purposes.

FIELD OF THE INVENTION

The present application relates to a method and system for loading resources.

BACKGROUND OF THE INVENTION

As the mobile Internet develops rapidly and HTML5 (HyperText Markup Language) technology steadily evolves, World Wide Web (web) applications (apps) have become popular options to mobile cross-platform app development.

Web apps are acquired through browsers and display web resources. The web resources are displayed in the form of pages. Browser functions can be implemented via web engines. The web engines include various components such as a render engine for rendering pages or a browser engine for exercising management and control.

Node.js is a JavaScript runtime environment (also called a runtime platform). Node.js provides various kinds of system-level application programming interfaces (APIs) and is used for building fast-response, easily extensible web apps. When a Web engine is launched, Node.js needs to be loaded first. As a result, the user has to wait a longer time for the Web engine to be launched.

SUMMARY OF THE INVENTION

A method and system for loading resources is provided.

In some embodiments, a method of loading resources comprises: sending, using a first thread, a resource loading request to a second thread, wherein the first thread and the second thread are located in the same process, and the first thread runs on a dynamic language runtime platform; receiving, using the first thread, an instruction sent back by the second thread based on the resource loading request; and based on the instruction and a resource preloaded by the process, loading, using the first thread, the resource whose loading was requested by the resource loading request, wherein the resource preloaded by the process comprises a web engine.

In some embodiments, a system for loading resources comprises: a first thread unit and a second thread unit.

In some embodiments, the first thread unit is configured to: send a resource loading request to the second thread unit, wherein the first thread unit and the second thread unit belong to the same process unit, and wherein the first thread unit runs on a dynamic language runtime platform; receive an instruction sent back by the second thread unit according to the resource loading request; and based on the instruction and a resource preloaded by the process, load the resource whose loading was requested by the resource loading request, wherein the resource preloaded by the process comprises a web engine.

In some embodiments, a process of an application is preloaded with a resource, wherein the resource preloaded by the process comprises a web engine. A first thread within the same process sends a resource loading request to a second thread. The first thread runs on a dynamic language runtime platform. The first thread receives an instruction sent back by the second thread based on the resource loading request. The first thread, based on the instruction and a module and/or resource preloaded by the process, loads the resource whose loading was requested by the resource loading request, and thus merges the web engine with the dynamic language runtime platform.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

An operating system that is used to provide user apps with the basic capabilities of an operating system can be implemented based on a dynamic language runtime platform and thus the operating system provides a runtime environment for dynamic language applications. Node.js is an example of a JavaScript runtime environment or runtime platform. The dynamic language runtime platform is preloaded with a plurality of modules called common modules, and the common modules provide specific functions, such as system service functions (such as clock, audio/video, etc.).

A dynamic language is a type of computer programming language. The dynamic language is a language that can dynamically change type or structure while running. For example, functions and attributes can be added, modified, and deleted while the program written in the dynamic language is running. In another example, JavaScript, Python, and Ruby are all dynamic languages. A dynamic language can be executed without having to be compiled. The dynamic language requires support when running. The environment that provides the dynamic language with runtime support is called a runtime environment. The runtime environment includes elements, such as a Java virtual machine and a JavaScript engine, required to run a dynamic language.

Using the host system in a cloud operating system (AliOS) as an example, AliOS can be implemented based on Node.js. Node.js is a JavaScript runtime environment, a web application framework built on Chrome's JavaScript engine. In other words, the operating system, based on Node.js, provides user apps with the basic capabilities of an operating system. Node.js includes multiple modules. These modules can be obtained by packaging code used to implement specific functions (e.g., code that implements operating system-level service functions). For example, the modules can be packaged in the form of components. These modules can, for example, include components for implementing a positioning function of the Global Positioning System (GPS), components for implementing power source management functions, etc. The interfaces for these modules can be exposed to the application layer. The applications (e.g., web apps) in the application layer can execute processes provided by these modules by calling the modules' interfaces and analyzing code in the modules with the JavaScript engine. Accordingly, the processes implement functions provided by these modules.

Regarding web apps, loading of web resources (e.g., web page acquisition, rendering, and other such operations) can be implemented by a browser, and the browser loads web resources based on a web engine. Typically, there are two types of threads in the web engine of a traditional HTML5 browser: a browser thread and a render thread. The browser thread corresponds to the main thread. The browser thread can provide service and management capabilities for rendering a web page. The render thread is a child-thread that is launched by the main thread. The render thread can render pages and execute JavaScript code using the web engine. The browser thread can create one or more render threads. For example, during the loading of a web page, the browser thread creates a render thread, and the render thread renders the web page. In another example, the browser thread creates more than one render threads, and each render thread renders one web page.

Figure 1:
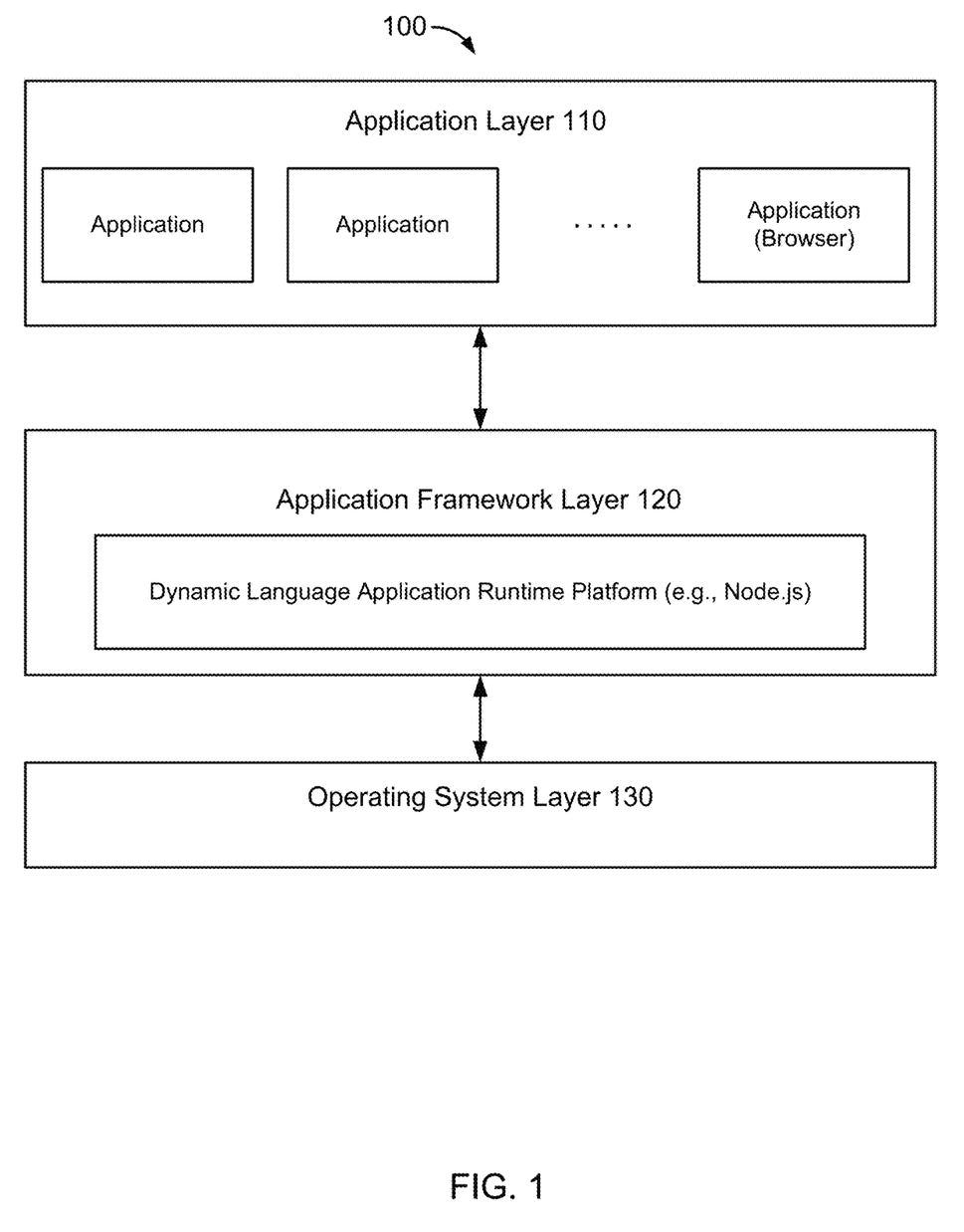
FIG. 1 shows an embodiment of a Node.js-based cloud operating system architecture.

FIG. 1 shows an embodiment of a Node.js-based cloud operating system architecture. Operating system 100 comprises an application layer 110, an application framework layer 120, and an operating system layer 130. The application layer 110 comprises one or more apps, which can include a browser. The application framework layer 120 comprises a dynamic language runtime platform (e.g., Node.js). The dynamic language runtime platform is a runtime environment that adds a set of services for dynamic languages to a common language runtime platform. The operating system layer 130 is typically used to provide operating system-level repositories and basic system services. For example, the provided system services include device driver services, event management services, etc.

The browser web engine can be located in the application layer and can lack the ability to use system services provided by Node.js. In the event that it is necessary to enable the render thread in the web engine to use a capability provided by Node.js, Node.js is to be started during the process of starting the render thread. Each time a web page is loaded, a render thread is to be started, and Node.js is to be started, too. As a result, web page loading involves a rather large expenditure of system resources such as memory and processing cycles.

Merging the web engine with Node.js so that the web engine becomes a part of system services, enables the HTML request-based web page access processing process to use all types of system-provided capabilities is described.

In some embodiments, based on the architecture described above, enabling a web engine to access capabilities provided by Node.js can thereupon use less resource and time expenditures relative to the approach described above.

In some embodiments, in the event that a dynamic language runtime platform starts, the dynamic language runtime platform preloads various resources, including a web engine.

Using Node.js as an example of a dynamic language runtime platform, a Node.js process is created in the event that Node.js undergoes activation. The Node.js process preloads various capabilities. "Capabilities," as used in this context, can also be referred to as resources, which can include modules (e.g., components) for implementing specific functions, as described above. The capabilities can also include configuration information such as context and event queues. The capabilities preloaded by Node.js can include at least a web engine (e.g., a webview component in an Android system). The capabilities can also include capabilities provided by Node.js. The capabilities provided by Node.js can include: modules within Node.js (e.g., components used to provide specific functions or services), information relating to the JavaScript runtime environment, or both. Modules in Node.js can be obtained by packaging JavaScript code used to implement specific functions. Each module has an interface (e.g., an API), which can be provided to the application layer and made available for calling by programs. Information relating to the JavaScript runtime environment can include JavaScript engine context, event loop-related configurations, or both. The context can be used to describe various objects, statuses, and functions internal to the engine. An examples of an object includes Bluetooth, audio, phone call, or any capability that the can be provided by a device. An example of a status includes a status of a Bluetooth object, a status of an audio object, a status of a phone call object, or any status of another object of the device. An example of a function internal to the engine includes a web page management function. JavaScript engine context can include interfaces (e.g., APIs) of modules preloaded by the Node.js process. Event loop-related configurations can include Node.js event queue configurations, e.g., a memory location of event queue and queue size, to facilitate access of Node.js event requests and web event requests in the event queue.

Figure 2:
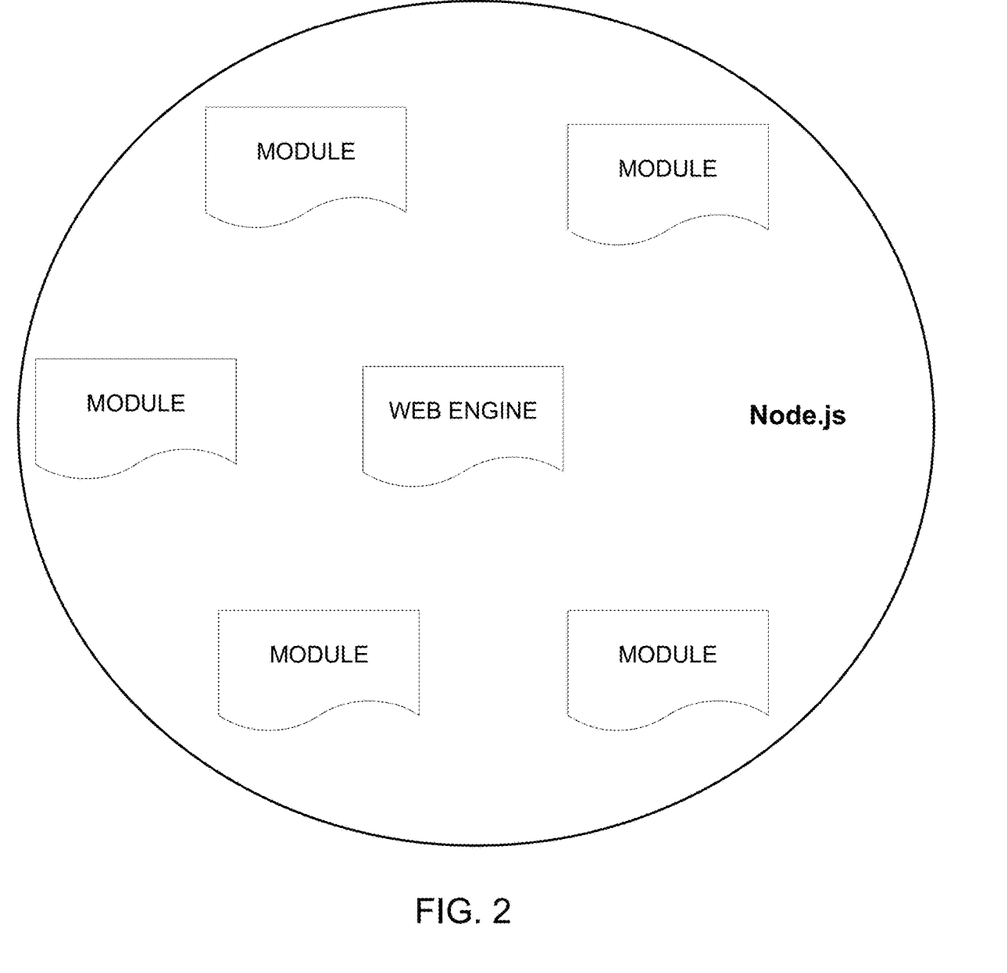
FIG. 2 presents a diagram of an embodiment of a Node.js preloaded with a web engine.

In some embodiments, a preloaded capability (such as a web engine) is packaged into a standard module on a dynamic language runtime platform so that the preloaded capability is preloaded onto the platform as a standard module of the platform. Using Node.js as an example of the platform, FIG. 2 presents a diagram of an embodiment of a Node.js preloaded with a web engine.

Figure 3:
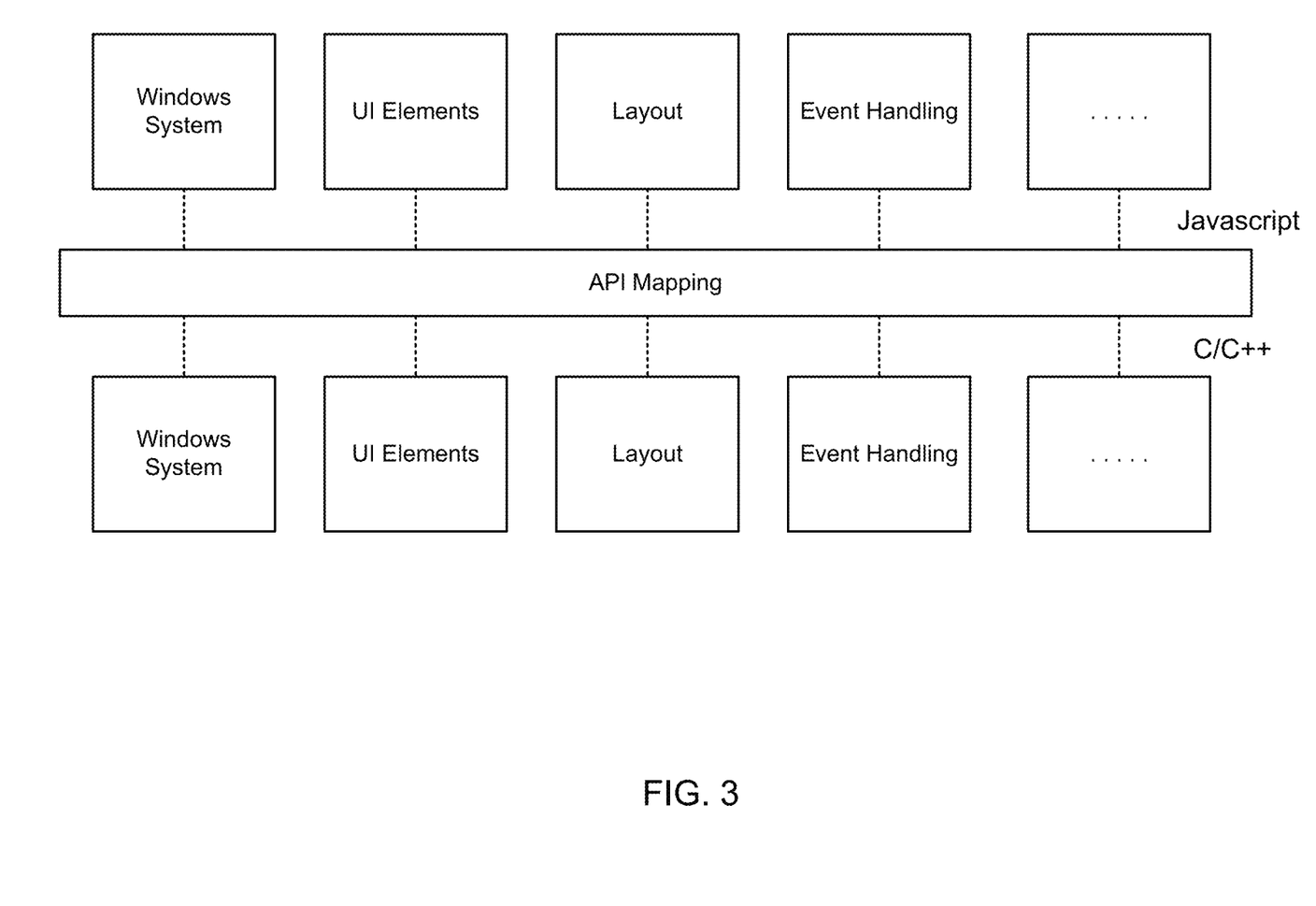
FIG. 3 presents a diagram of an embodiment of a web engine API mapping relationships.

In some embodiments, the web engine is compiled in C/C++, and Node.js supports JavaScript language. Therefore, web engine APIs that match C/C++ standards need to be mapped to Node.js APIs, and provide the mapped Node.js APIs to the application layer. Node.js stores the API mapping relationships. FIG. 3 presents a diagram of an embodiment of a web engine API mapping relationships. The web engine can include multiple components, e.g., window system components, user interface (UI) element components, layout components, event handling components, etc. The APIs of these C/C++ standard-compliant components are mapped on a one-to-one basis to corresponding JavaScript standard-compliant APIs.

Furthermore, in some embodiments, preloaded capabilities can also include one or more of the following:

Operating system-provided capabilities

Operating system-provided capabilities can include: system services provided by the operating system layer, etc. The operating system layer can include modules for providing system services such as network, Bluetooth, audio, video, etc. These modules can be obtained by packaging code used to implement specific functions. Each module has an interface (e.g., an API). In some embodiments, preloading of operating system capabilities can be implemented by adding APIs of modules in the operating system layer to the context of a dynamic language engine (e.g., a JavaScript engine).

User-defined capabilities

User-defined capabilities, i.e., user-defined code for implementing specific functions, can be packaged into modules, with each module having an interface (e.g., an API). In some embodiments, preloading of user-defined capabilities is implemented by adding APIs of user-defined modules to the context of a dynamic language engine (e.g., a JavaScript engine).

In some embodiments, the module interfaces (e.g., APIs) in the JavaScript context in Node.js are added to the JavaScript context of the web engine. Thus, an application developer can use the APIs included in the JavaScript context of the web engine to develop an application. In the event that the application is run, the Node.js thread can call the corresponding modules via the interfaces to implement corresponding functions, i.e., access the capabilities corresponding to these interfaces. Because the module interfaces in the Node.js context can include module interfaces in Node.js and can also include module interfaces provided by the operating system and interfaces of user-defined modules, the Node.js thread can access a wide array of capabilities.

The module interfaces in the JavaScript context of the web engine included in the Node.js JavaScript context can be added to the JavaScript context of Node.js.

The main thread in the Node.js process is called the Node.js thread. The Node.js thread can share the Node.js process runtime environment and the capabilities preloaded by the Node.js process. In other words, the Node.js thread can access the capabilities preloaded by the Node.js process. Since the Node.js process preloads the web engine, the Node.js thread can implement, based on the web engine, the functions provided by the web engine, e.g., page rendering functions.

Figure 4:
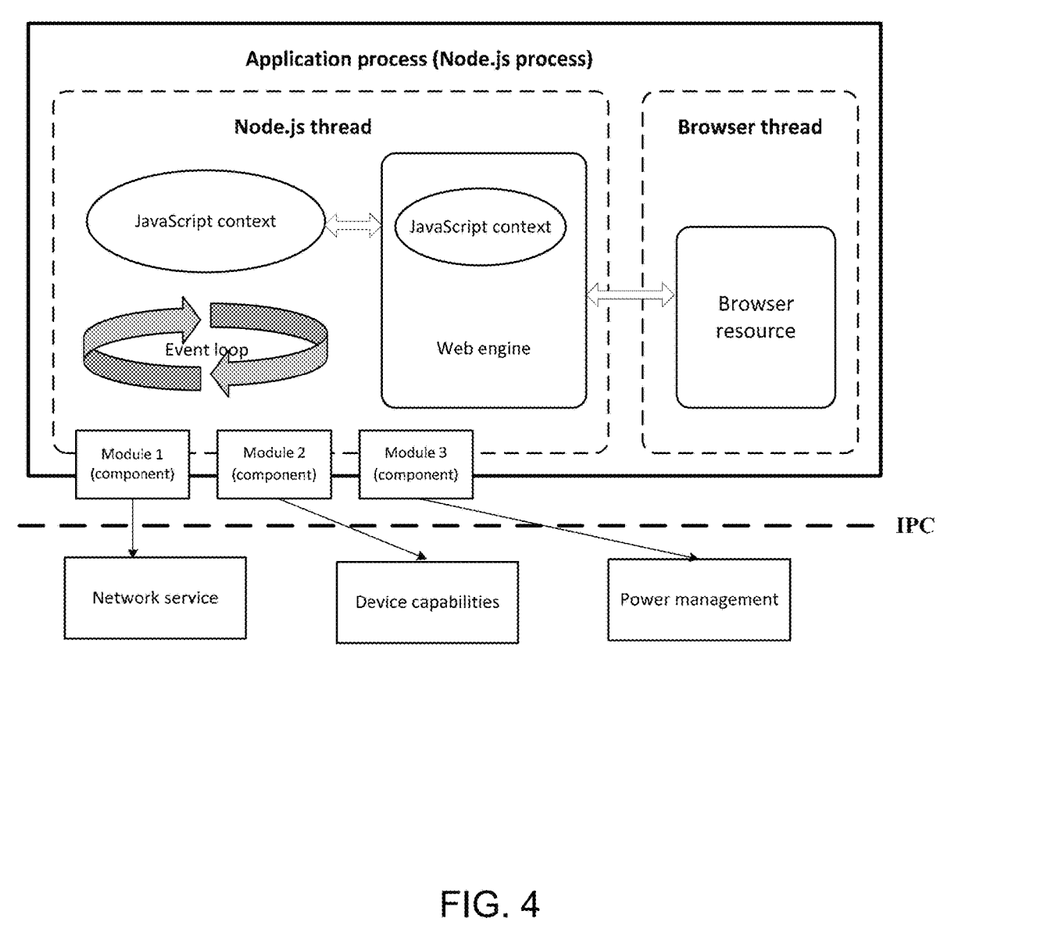
FIG. 4 presents a diagram of an embodiment of a Node.js thread preloaded with a web engine and a browser thread with its related resource.

FIG. 4 presents a diagram of an embodiment of a Node.js thread preloaded with a web engine and a browser thread with its related resource. As shown in FIG. 4, the application process includes a Node.js thread and a browser thread. The Node.js thread and the browser thread can communicate with each other. The Node.js thread processes events based on a Node.js event loop mechanism. The Node.js thread can implement web resource loading operations based on the web engine. As an example, the Node.js thread loads pages by calling a page loading technique provided by the web engine. While executing the page loading technique, the Node.js thread can call the corresponding module (component) based on an API in the JavaScript context in the web engine. The JavaScript engine analyzes the called module, obtains the interface provided by the operating system layer to the JavaScript engine, and calls, based on the interface, capabilities provided by the operating system layer (e.g., the device capabilities, network services, and power management as shown in FIG. 4) to implement the page loading technique. As shown in FIG. 4, the shown Node.js thread corresponds to a main thread, and the browser thread corresponds to a sub-thread. In other words, the browser thread can be created by the Node.js thread. The Node.js thread and the browser thread can communicate with each other based on an inter-thread communication technique. The application process and other processes (e.g., processes corresponding to network service modules located in the operating system layer as shown in FIG. 4) communicate with each other based on an inter-process communication (IPC) mechanism.

For example, the Node.js thread can call Module 1 (network module) in FIG. 4 to execute a page acquisition technique. While this page acquisition technique is being executed, an interface provided by the operating system layer can be used to call a network service provided by the operating system layer to acquire the requested page. To provide another example, the Node.js thread can call Module 2 (capability acquisition module) in FIG. 4 to execute a device capability (e.g., display screen size and other such device information) acquisition technique and determine the display mode based on the device capability. While this device capability acquisition technique is being executed, an interface provided by the operating system layer can call a device capability provided by the operating system layer to acquire the device capability information.

Figure 5A:
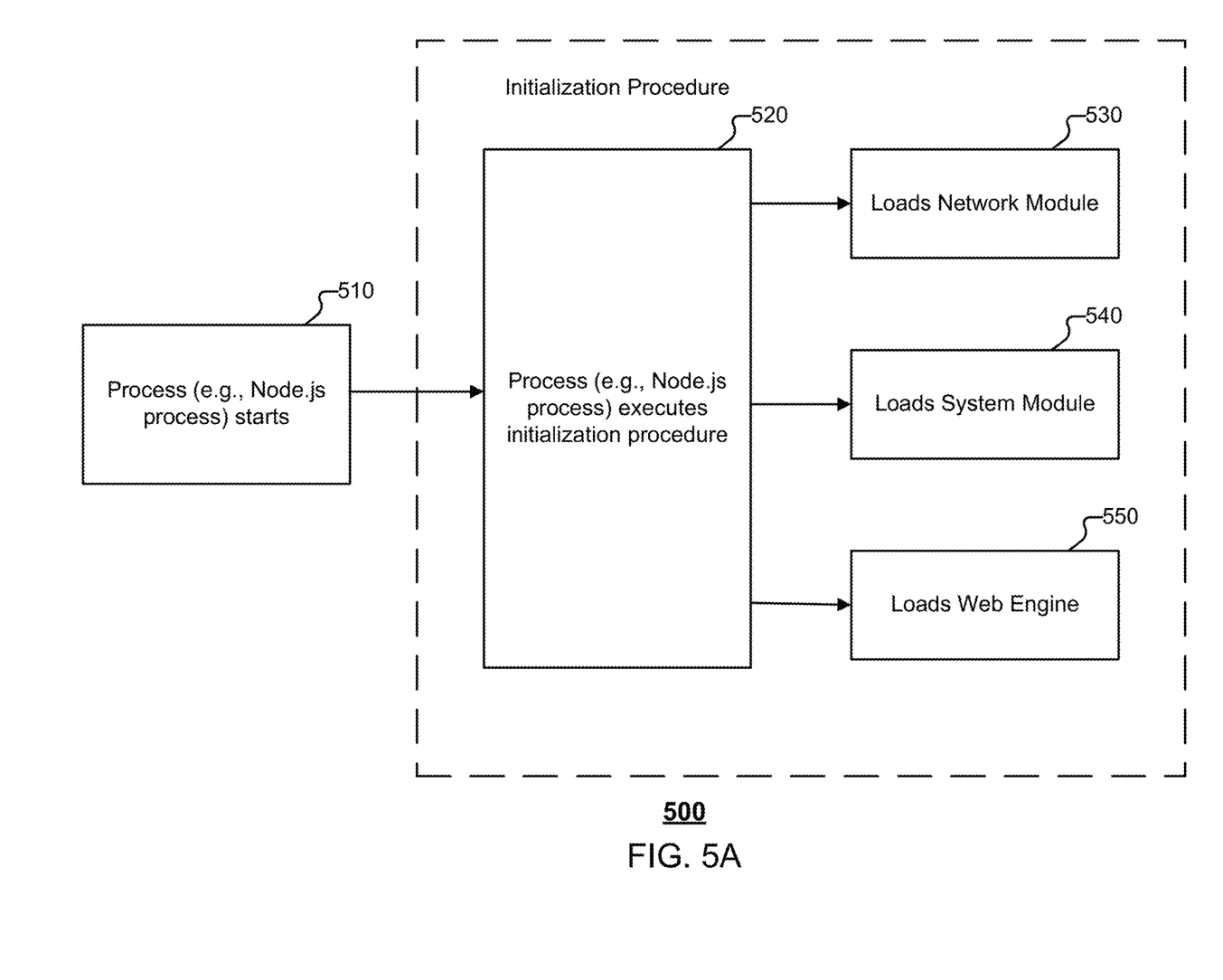
FIG. 5A presents a diagram of an embodiment of a process for initializing a Node.js process.

FIG. 5A presents a diagram of an embodiment of a process for initializing a Node.js process. In some embodiments, the process 500 for initializing the Node.js process is implemented by operating system 100 of FIG. 1 and comprises:

For example, as shown in FIG. 5A, in 510, after an event that opens one page in a browser window is received, one Node.js process is started. In 520 through 550, the process 500 executes an initialization procedure. In some embodiments, the process 500 preloads a network module, a system module, a render engine (Web engine), and other such modules. The process 500 can correspond to a Node.js process.

Furthermore, a first thread is created in 520 through 550. The first thread, by calling a new object technique provided by the web engine, creates a web component object and starts this web component object, creating a second thread. The first thread can then, based on the web component object, load a page in the browser window by calling the resource loading technique provided by the object. The first thread can be a Node.js thread, and the second thread can be a browser thread.

Figure 5B:
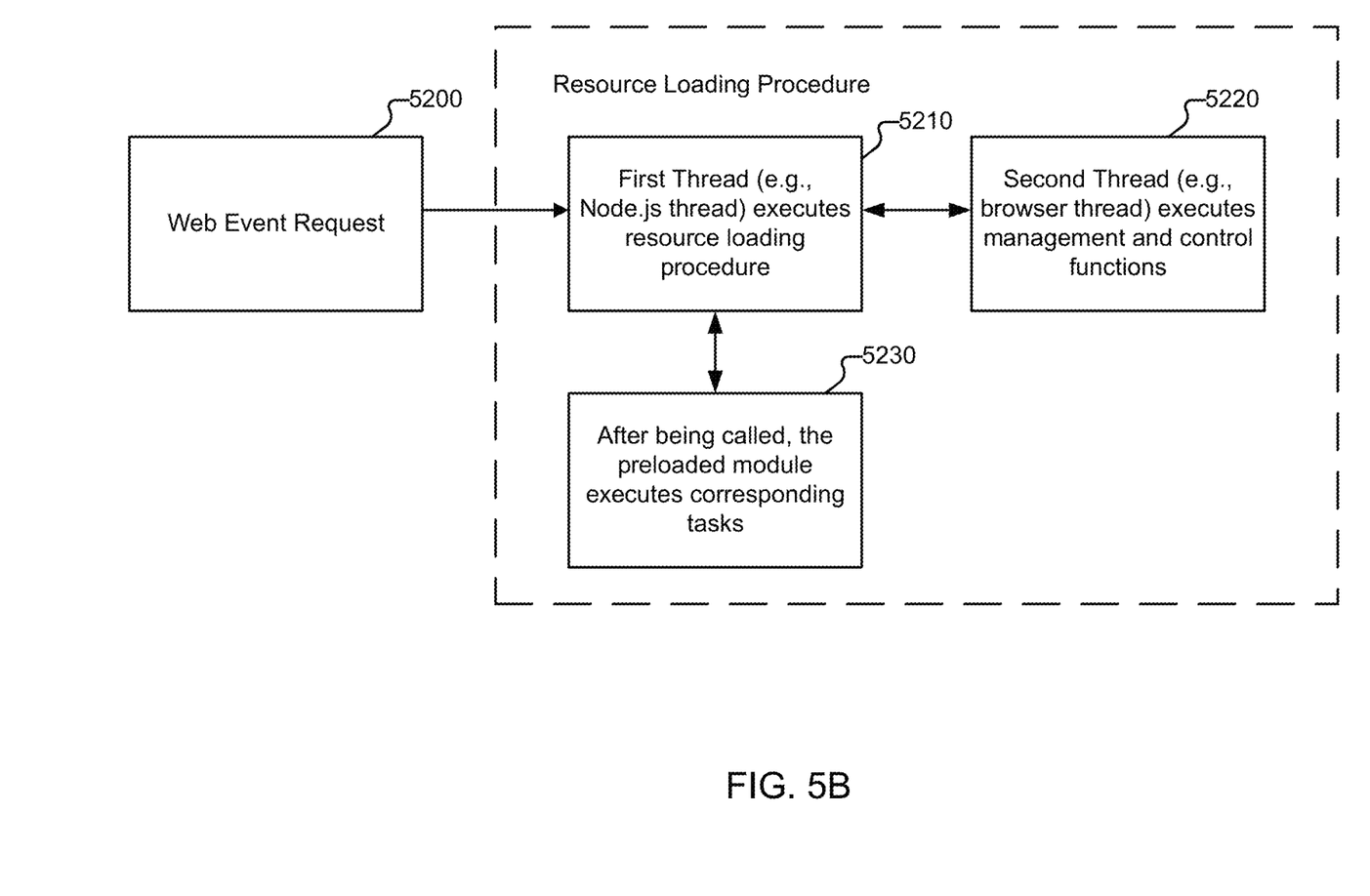
FIG. 5B presents a diagram of an embodiment of a process for loading resources.

FIG. 5B presents a diagram of an embodiment of a process for loading resources. As shown in 5200 through 5230 in FIG. 5B, after the first thread obtains a web event request (e.g., a user sends an HTML request via the browser to request the opening of one web page, and then an operation of a user triggers generation of a web event request), the first thread executes a resource loading procedure to load the requested web page. This process for loading resources can include acquisition of resources, page rendering, etc. During the process for loading resources, the first thread sends a resource loading request to a second thread, receives an instruction sent back by the second thread according to the resource loading request, and loads, based on the instruction and a resource preloaded by the process where the first thread is located, the resource whose loading was requested by the resource loading request. During the process for loading resources, the second thread, which is typically for implementing management and control functions, can instruct the first thread to call the system module required for the resource loading procedure to implement the process for loading resources. Acquisition of resources, page rendering, and other such operations are executed by the first thread. By calling a preloaded module, such as a network module or a system module, the first thread executes the corresponding tasks. Please note that, whenever the first thread obtains a web event request, the first thread can respond to the event request based on the preloaded module.

In the above process for loading resources, the instruction sent by the second thread to the first thread can include control information (e.g., a control instruction) relating to resource loading, instruction information (e.g., the API that needs to be called) about the resource required by the resource loading operation, or system information required for loading resources. As an example, the instruction to be sent by the second thread to the first thread can include one of the following pieces of control information to control the web page loading technique of the first thread: control information on starting loading of a web page, control information on stopping loading of a web page, information on loading the previous page or the next page, or any combination thereof. In another example, the instruction sent by the second thread to the first thread includes a system module-provided API that enables the first thread to use the API to call functions of the relevant system module to implement features such as increase/decrease volume, dynamically acquire device battery status, acquire geographic location in real time, device vibrate, or any combination thereof. In yet another example, the instruction sent by the second thread to the first thread can include system information (i.e., the second thread transmits system information to the first thread). This system information can be made available for use by the first thread. For example, the system information includes the device's media access control (MAC) address, the device ID, user account information, or other such information.

As an example, the web page loading technique can include the following: a Node.js thread acquires, using a network module, the HTML document requested by a web event request. The Node.js thread analyzes the obtained HTML document and converts tags in the HTML document into Document Object Model (DOM) nodes in a DOM tree to obtain a DOM tree structure. The Node.js thread analyzes the Cascading Style Sheets (CSS) file. The information obtained through analysis and visible instructions (e.g., <b></b>) in the HTML document is used to build a render tree. The render tree is typically composed of rectangles including attributes such as color, width, and height. The rectangles are sequentially displayed on the screen. The Node.js thread executes the layout technique based on the render tree and determines the screen coordinates corresponding to each node and their coverage and reflow, etc., traverses the render tree, and uses the UI back-end layer to render each node. The layout technique is a well-known technique and will not be further discussed for conciseness.

In some embodiments, the Node.js thread in operation 5210 can use a resource preloaded in Node.js to execute the process. For example, the Node.js thread loads, based on an interface of a module in the JavaScript context of the web engine, the requested resource by calling a technique provided by the corresponding module. Interfaces in the JavaScript context of the web engine can include interfaces of the original modules in Node.js. The interfaces in the JavaScript context can also include interfaces of modules in the operating system layer and interfaces of user-defined modules. Various capabilities are thus merged within the web engine.

In some embodiments, in 5210, the Node.js thread can load, based on the JavaScript engine in the Node.js initialized in the start procedure, the web resources whose loading was requested without having to reinitialize the JavaScript engine. As an example, the Node.js thread can call the corresponding modules based on interfaces of the modules used for resource loading that are provided by the web engine, and the Node.js thread analyzes the modules using the JavaScript engine preloaded by the Node.js process to obtain the module interfaces within the operating system that are called by the modules. The module interfaces obtained through analysis can be used to call the corresponding modules in the operating system.

Both Node.js and the web engine employ an event loop mechanism. Conventionally, the web engine event loop and the Node.js event loop are independent of each other. In the present application, the web engine can be preloaded onto the dynamic language runtime platform (e.g., Node.js). Therefore, web engine events and events of the platform can undergo event looping based on an event queue. If no event occurs, the event loop is in a waiting mode and is blocked. If an event occurs (e.g., a web engine event), the event loop is woken up. For example, if a web engine event occurs, the event loop is woken up asynchronously, and the web engine event is stored in the event queue. The event queue typically uses a first-in first-out mechanism.

Figure 6:
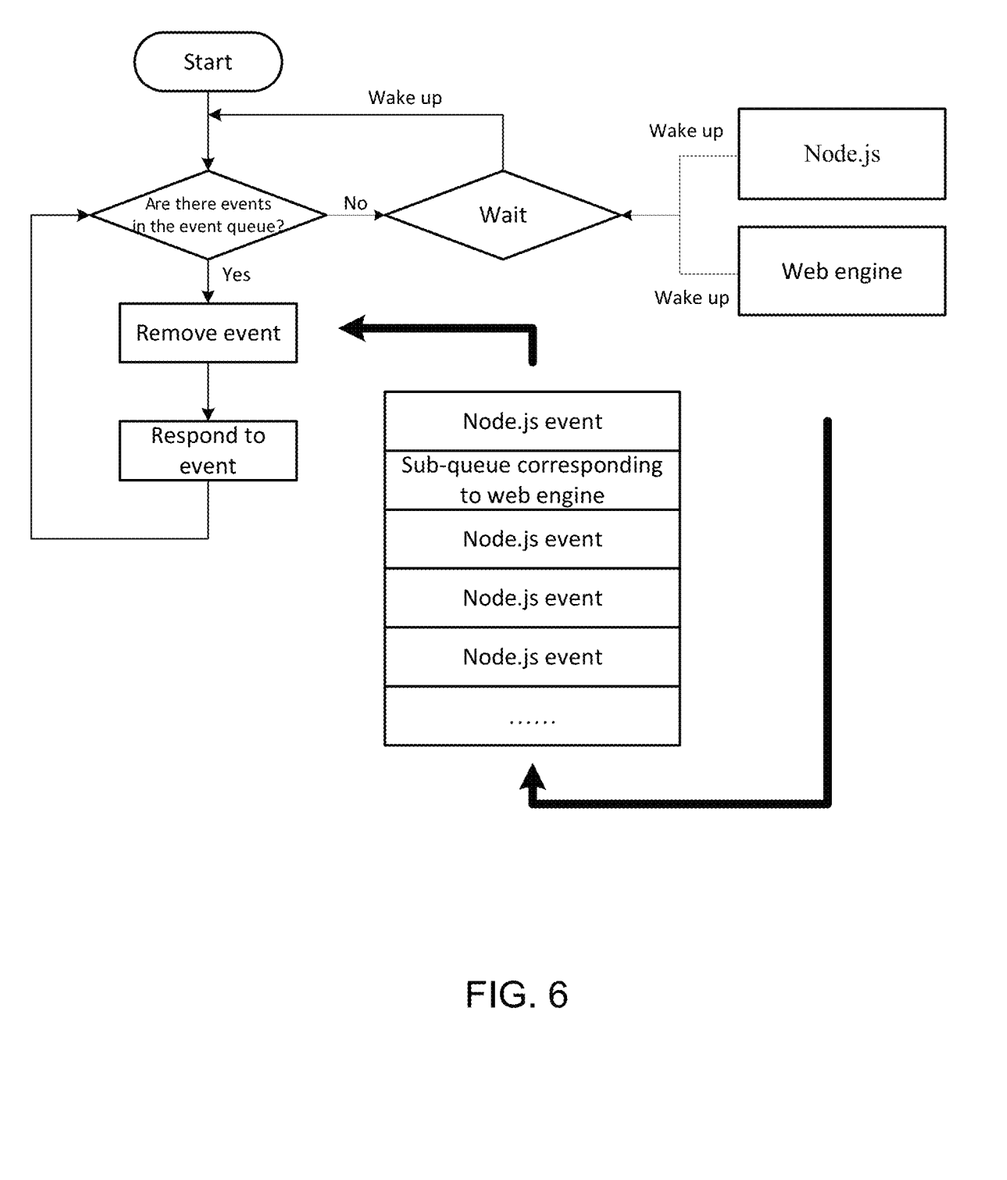
FIG. 6 presents a diagram of an embodiment of an event looping mechanism.

Using the example of Node.js, FIG. 6 presents a diagram of an embodiment of an event looping mechanism. As shown in FIG. 6, Node.js event requests and web event requests are stored in the queue in the order they occur. In some embodiments, a web event request participates as a whole in the event loop. For example, a web engine event is stored as a sub-queue. In the event that, while the Node.js thread is reading events from the event queue and responding, the currently read item corresponds to a sub-queue, then all the event requests in the sub-queue are removed based on scheduling policy rules, and the handler associated with the web engine event handles all event requests within the sub-queue. After completing all the responses, the Node.js thread returns to the event loop and continues to read other event requests from the event queue and respond to them, thus the Node.js thread merges event handling in the web engine with the node event loop. In another example, the scheduling policy is set as follows: in the event that the currently read item is a sub-queue corresponding to the web engine, then the Node.js thread removes an appropriate quantity of event requests from the sub-queue according to a preset handling capacity (e.g., it is established that K event requests are removed at one time for a response; the value of K can be preset). The handler for the web event requests handles the removed web event requests and, after responding to these event requests, the handler returns to the event loop.

From the description, a Node.js process can be preloaded with a resource. In some embodiments, the Node.js process-preloaded resource includes a web engine. The Node.js thread within the same Node.js process sends a resource loading request to the browser thread. The Node.js thread corresponds to the main thread, and the browser thread corresponds to the sub-thread. The Node.js thread receives an instruction sent back by the browser thread based on the resource loading request. The Node.js thread, in accordance with the instruction and based on a resource preloaded by the Node.js process, loads the resource whose loading was requested by the resource loading request and thus merges the web engine with Node.js.

Due to the universality of the web engine system, the web engine system has good cross-platform capabilities. In some embodiments, the web engine system is merged with Node.js to enable the web engine system to access the capabilities provided by Node.js and provide the possibility for more flexible and wide-ranging applications of provided functions.

The above embodiment can be applied to a mobile terminal such as a mobile phone, a smart wearable device, a vehicle-mounted device, or a personal digital assistant (PDA). In an example, as applied to a cloud operating system-based mobile phone, a Node.js main thread can render pages based on a Web engine and thus enable page rendering operations to use capabilities accessible by the Node.js main thread, thus achieving a merger of Node.js with the web engine.

Figure 7:
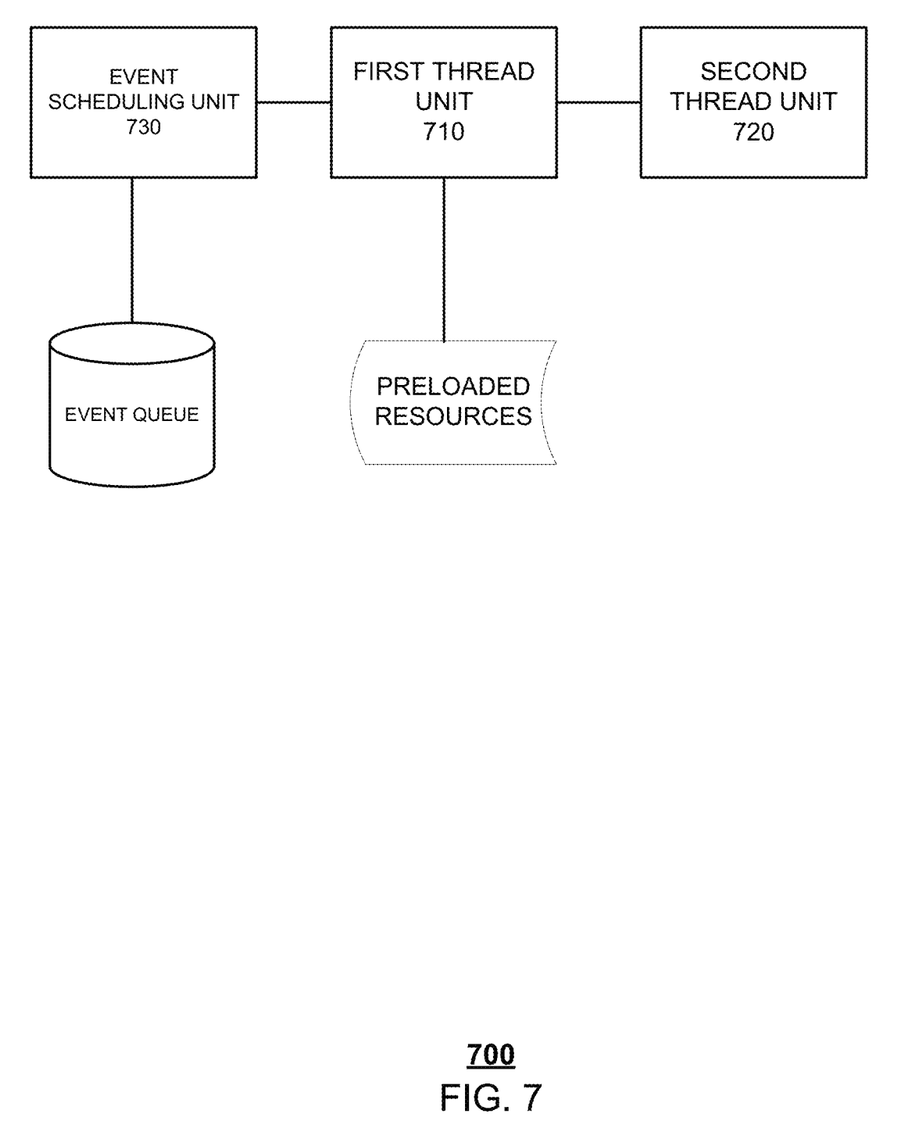
FIG. 7 presents a structural diagram of an embodiment of a system for loading resources.

FIG. 7 presents a structural diagram of an embodiment of a system for loading resources. In some embodiments, the system 700 is configured to implement that operations 5200 to 5230 of FIG. 5B and comprises: a first thread unit 710 and a second thread unit 720.

In some embodiments, the first thread unit 710 and the second thread unit 720 belong to the same process unit. The first thread unit 710 runs on a dynamic language runtime platform. In some embodiments, the system 700 can further include an event scheduling unit 730.

In some embodiments, the first thread unit 710 is configured to: send a resource loading request to the second thread unit, receive an instruction sent back by the second thread unit 720 based on the resource loading request; and, based on the instruction and a resource preloaded by the process unit, load the resource whose loading was requested by the resource loading request. In some embodiments, the module preloaded by the process unit comprises a web engine.

In some embodiments, the event queue corresponding to the process includes a sub-queue corresponding to the web engine. The sub-queue can include web event requests. In some embodiments, the event scheduling unit 730 is configured to: acquire a to-be-handled event request from the event queue; in the event that the sub-queue is acquired, acquire web event requests in the sub-queue in chronological order; and send the acquired web event requests to the first thread unit 710. In some embodiments, the first thread unit 710 is specifically configured to: send a resource loading request to the second thread unit 720 upon receiving the web event request.

In some embodiments, the event queue corresponding to the process further includes a dynamic language runtime platform event request. As an example of the dynamic language runtime platform event request, the first thread obtains a web event request (e.g., a user sends an HTML request via the browser to request the opening of one web page, and then an operation of a user triggers generation of a web event request. The event scheduling unit 730 is further configured to: after handling of the web event requests in the sub-queue is completed, return to the event queue and acquire to-be-handled dynamic language runtime platform event requests; or after handling of a set quantity of the web event requests in the sub-queue is completed, return to the event queue and acquire to-be-handled dynamic language runtime platform event requests.

In some embodiments, the process unit is configured to: preload resources upon starting, wherein the preloaded resources include the web engine and include one or more combinations of modules provided by the dynamic language runtime platform, modules provided by the operating system, and self-defined modules, the modules being obtained by packaging code used to implement specific functions.

In some embodiments, the process unit is configured to: preload resources upon starting, the preloaded resources including interfaces of modules provided by the dynamic language context, including the web engine, and interfaces of modules preloaded by the process. The modules preloaded by the process include: one or more combinations of modules provided by the dynamic language runtime platform, modules provided by the operating system, and self-defined modules.

In some embodiments, the first thread unit 710 is configured to: call, based on the interfaces provided by the web engine, corresponding modules, the called modules being configured to load resources whose loading was requested; and analyze the modules using the dynamic language engine preloaded by the process to obtain the module interfaces within the operating system that are called by the modules. The module interfaces obtained through analysis are used to call the corresponding modules in the operating system.

In some embodiments, the first thread unit 710 is configured to: send a resource loading request to the second thread unit 720 based on a web page access request; and the resource loading request requests loading of the resources of the requested web page.

In some embodiments, the first thread unit 710 is the main thread unit in the process; and the second thread unit 720 is the sub-thread unit in the process.

In some embodiments, the dynamic language runtime platform is Node.js; the first thread unit is a Node.js thread unit; and the second thread unit is a browser thread unit.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software units, or combinations of both. Software units can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 8:
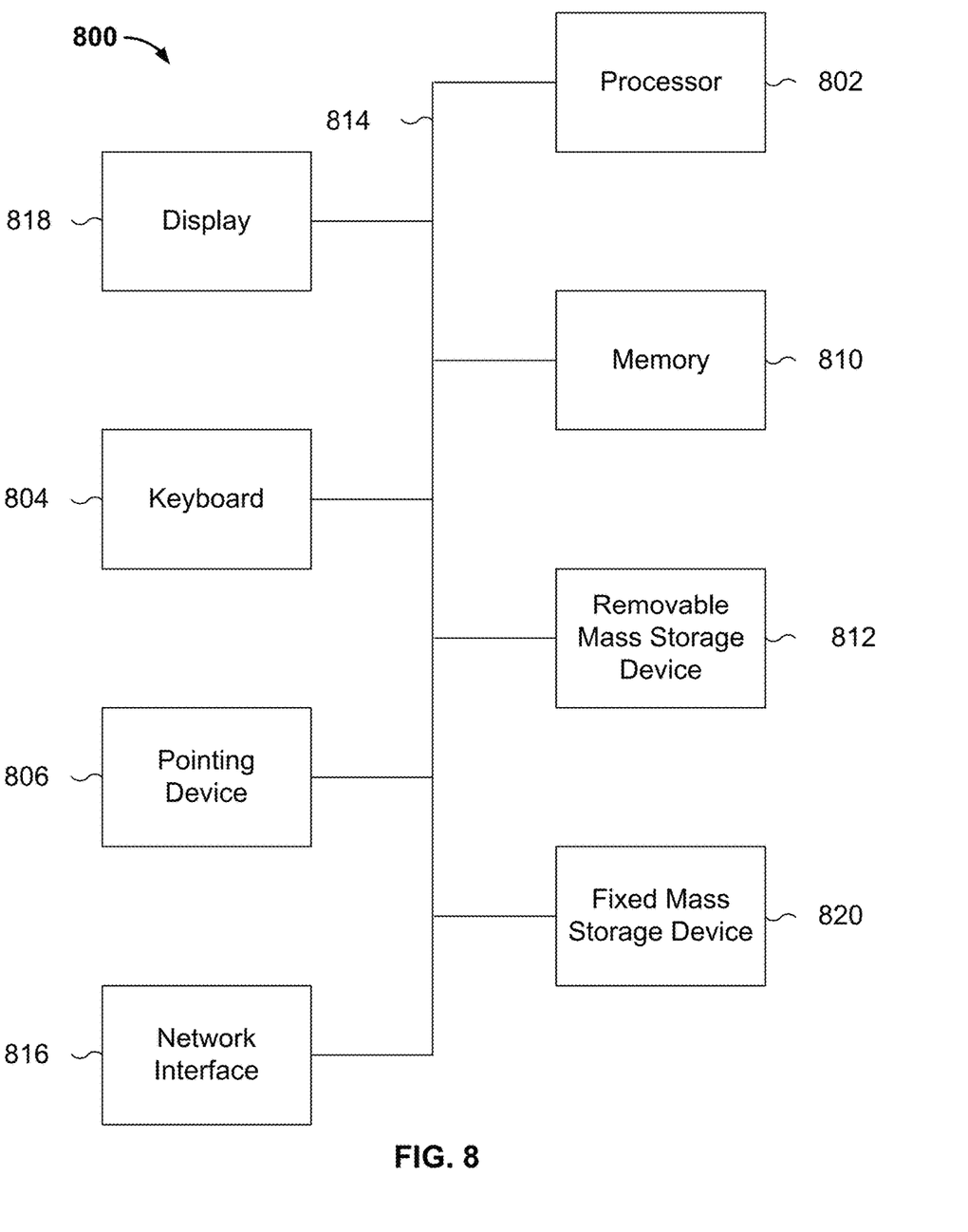
FIG. 8 is a functional diagram illustrating a programmed computer system for loading resources in accordance with some embodiments.

FIG. 8 is a functional diagram illustrating a programmed computer system for loading resources in accordance with some embodiments. As will be apparent, other computer system architectures and configurations can be used to load resources. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818).

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data and objects used by the processor 802 to perform its functions (e.g., programmed instructions). For example, memory 810 can include any suitable computer-readable storage media, described below, depending on whether, for example, data access needs to be bi-directional or uni-directional. For example, processor 802 can also directly and very rapidly retrieve and store frequently needed data in a cache memory (not shown).

A removable mass storage device 812 provides additional data storage capacity for the computer system 800, and is coupled either bi-directionally (read/write) or uni-directionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storages 812 and 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

Figure 9:
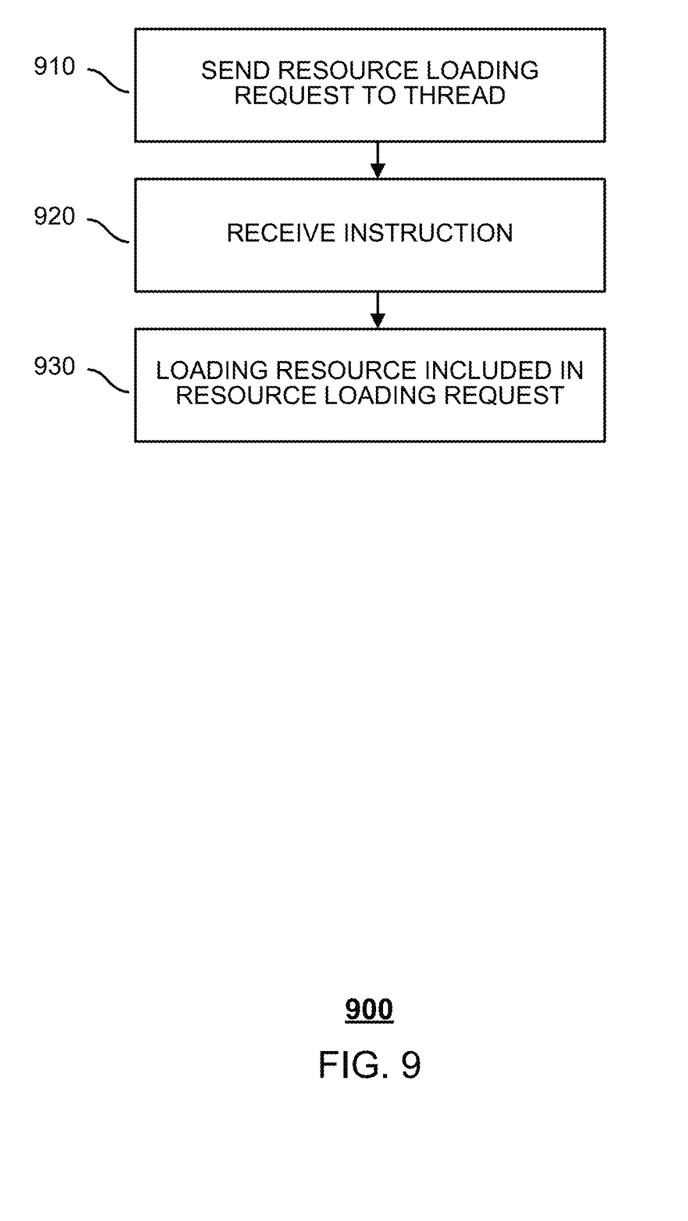
FIG. 9 presents a diagram of another embodiment of a process for loading resources.

FIG. 9 presents a diagram of another embodiment of a process for loading resources. In some embodiments, the process 900 is implemented by a client implementing the operating system 100 of FIG. 1 and comprises:

In 910, the client sends, using a first thread, a resource loading request to a second thread. In some embodiments, the resource loading request includes a request for a resource. In some embodiments, the first thread and the second thread are located in the same process. In some embodiments, the first thread runs on a dynamic language runtime platform.

In 920, the client receives, using the first thread, an instruction sent back by the second thread in response to the resource loading request.

In 930, the client based on the instruction and the resource preloaded by the process, loads, using the first thread, the resource included in the resource loading request. In some embodiments, the resource preloaded by the process includes a web engine.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    sending, using a first thread, a resource loading request to a second thread, wherein:
        the resource loading request includes a request for a resource;
        the first thread and the second thread are located in one process, wherein an event queue corresponding to the one process comprises a sub-queue corresponding to a web engine, wherein the sub-queue comprises web event requests;
        the first thread runs on a dynamic language runtime platform; and
        the sending of the resource loading request to the second thread comprises:
            acquiring, using the first thread, a to-be-handled event request from the event queue;
            in the event that the sub-queue is acquired, acquiring web event requests in the sub-queue; and
            after acquiring the web event requests, sending the resource loading request to the second thread;
    receiving, using the first thread, an instruction sent back by the second thread in response to the resource loading request, wherein the instruction includes at least one application programming interface (API) required by an operating system to call one or more modules, and wherein the at least one API is configured to: increase/decrease volume of a module configured to provide audio services, dynamically acquire device battery status of a module configured to implement power source management functions, acquire geographic location in real time of a module configured to provide a positioning function of the Global Positioning System (GPS) services, or any combination thereof;
    preloading resources upon starting, wherein the preloaded resources include the web engine and the one or more modules provided by the operating system, wherein the one or more modules provided by the operating system comprise the module configured to provide audio services, the module configured to implement power source management functions, the module configured to provide the positioning function of the Global Positioning System (GPS) services, or any combination thereof, and wherein the one or more modules provided by the operating system are obtained by packaging code used to implement specific functions; and
    based on the instruction and the preloaded resources, loading, using the first thread, the resource included in the resource loading request.

2. The method as described in claim 1, wherein:
    the event queue corresponding to the process further comprises a dynamic language runtime platform event request; and
    the method further comprises:
        handling all or a set quantity of the web event requests in the sub-queue; and
        after handling all or the set quantity of the web event requests in the sub-queue is completed:
            returning to the event queue; and
            acquiring to-be-handled dynamic language runtime platform event requests from the event queue.

3. The method as described in claim 1, wherein the loading of the resource included in the resource loading request comprises:
    calling, using interfaces provided by the web engine, corresponding modules, wherein the called corresponding modules are used to load the resource included in the resource loading request;
    analyzing the modules using a dynamic language engine preloaded by the process to obtain module interfaces in the operating system that are called by the modules; and
    calling, using the module interfaces obtained through the analyzing of the modules, the corresponding modules in the operating system.

4. The method as described in claim 1, wherein the sending of the resource loading request comprises:
    sending the resource loading request to the second thread based on a web page access request, wherein the resource loading request requests loading of a resource of a requested web page.

5. The method as described in claim 1, wherein:
    the first thread is a main thread in the process; and
    the second thread is a sub-thread in the process.

6. The method as described in claim 1, wherein:
    the dynamic language runtime platform corresponds to Node.js;
    the first thread corresponds to a Node.js thread; and
    the second thread corresponds to a browser thread.

7. A system, comprises:
    a processor; and
    a memory coupled with the processor, wherein the memory is configured to provide the processor with instructions which when executed cause the processor to:
        send, using a first thread, a resource loading request to a second thread, wherein:
            the resource loading request includes a request for a resource;
            the first thread and the second thread are located in one process, wherein an event queue corresponding to the one process comprises a sub-queue corresponding to a web engine, wherein the sub-queue comprises web event requests;
            the first thread runs on a dynamic language runtime platform; and
            the sending of the resource loading request to the second thread comprises to:
                acquire, using the first thread, a to-be-handled event request from the event queue;
                in response to a determination that the sub-queue is acquired, acquire the web event requests in the sub-queue; and
                after acquiring the web event requests, send the resource loading request to the second thread;

receive, using the first thread, an instruction sent back by the second thread in response to the resource loading request, wherein the instruction includes at least one application programming interface (API) required by an operating system to call one or more modules, and wherein the at least one API is configured to: increase/decrease volume of a module configured to provide audio services, dynamically acquire device battery status of a module configured to implement power source management functions, acquire geographic location in real time of a module configured to provide a positioning function of the Global Positioning System (GPS) services, or any combination thereof;

preload resources upon starting, wherein the preloaded resources include the web engine and the one or more modules provided by the operating system, wherein the one or more modules provided by the operating system comprise the module configured to provide audio services, the module configured to implement power source management functions, the module configured to provide the positioning function of the Global Positioning System (GPS) services, or any combination thereof, and wherein the one or more modules provided by the operating system are obtained by packaging code used to implement specific functions; and based on the instruction and the preloaded resources, load, using the first thread, the resource included in the resource loading request, wherein the resource preloaded by the process comprises a web engine.

8. The system as described in claim 7, wherein:

the event queue corresponding to the process further comprises a dynamic language runtime platform event request; and the processor is further configured to:

handle all or a set quantity of the web event requests in the sub-queue; and after handling all or the set quantity of the web event requests in the sub-queue is completed:

return to the event queue; and acquire to-be-handled dynamic language runtime platform event requests from the event queue.

9. The system as described in claim 7, wherein the loading of the resource included in the resource loading request comprises to:

call, using interfaces provided by the web engine, corresponding modules, wherein the called corresponding modules are used to load the resource included in the resource loading request;

analyze the modules using a dynamic language engine preloaded by the process to obtain module interfaces in the operating system that are called by the modules; and call, using the module interfaces obtained through the analyzing of the modules, the corresponding modules in the operating system.

10. The system as described in claim 7, wherein the sending of the resource loading request comprises to:

send the resource loading request to the second thread based on a web page access request, wherein the resource loading request requests loading of a resource of a requested web page.

11. The system as described in claim 7, wherein:

the first thread is a main thread in the process; and the second thread is a sub-thread in the process.

12. The system as described in claim 7, wherein the dynamic language runtime platform corresponds to Node.js;

the first thread corresponds to a Node.js thread; and the second thread corresponds to a browser thread.

13. A computer program product being embodied in a tangible non-transitory computer readable storage medium and comprising computer instructions for:

sending, using a first thread, a resource loading request to a second thread, wherein:

the resource loading request includes a request for a resource;

the first thread and the second thread are located in one process, wherein an event queue corresponding to the one process comprises a sub-queue corresponding to a web engine, wherein the sub-queue comprises web event requests;

the first thread runs on a dynamic language runtime platform; and the sending of the resource loading request to the second thread comprises:

acquiring, using the first thread, a to-be-handled event request from the event queue;

in the event that the sub-queue is acquired, acquiring web event requests in the sub-queue; and after acquiring the web event requests, sending the resource loading request to the second thread;

receiving, using the first thread, an instruction sent back by the second thread in response to the resource loading request, wherein the instruction includes at least one application programming interface (API) required by an operating system to call one or more modules, and wherein the at least one API is configured to: increase/decrease volume of a module configured to provide audio services, dynamically acquire device battery status of a module configured to implement power source management functions, acquire geographic location in real time of a module configured to provide a positioning function of the Global Positioning System (GPS) services, or any combination thereof;

preloading resources upon starting, wherein the preloaded resources include the web engine and the one or more modules provided by the operating system, wherein the one or more modules provided by the operating system comprise the module configured to provide audio services, the module configured to implement power source management functions, the module configured to provide the positioning function of the Global Positioning System (GPS) services, or any combination thereof, and wherein the one or more modules provided by the operating system are obtained by packaging code used to implement specific functions; and based on the instruction and the preloaded resources, loading, using the first thread, the resource included in the resource loading request.

\* \* \* \* \*